US012498556B2

(12) United States Patent
Amthor et al.

(10) Patent No.: US 12,498,556 B2
(45) Date of Patent: Dec. 16, 2025

(54) MICROSCOPY SYSTEM AND METHOD FOR EVALUATING IMAGE PROCESSING RESULTS

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 416 days.

(21) Appl. No.: 17/571,677

(22) Filed: Jan. 10, 2022

(65) Prior Publication Data

US 2022/0222822 A1 Jul. 14, 2022

(30) Foreign Application Priority Data

Jan. 12, 2021 (DE) .................... 10 2021 100 444.6

(51) Int. Cl.
*G02B 21/36* (2006.01)
*G06T 5/60* (2024.01)
*G06T 7/00* (2017.01)
*G06V 10/764* (2022.01)

(52) U.S. Cl.
CPC .............. *G02B 21/367* (2013.01); *G06T 5/60* (2024.01); *G06T 7/0014* (2013.01); *G06V 10/764* (2022.01); *G06T 2207/10056* (2013.01); *G06T 2207/30024* (2013.01); *G06T 2207/30242* (2013.01)

(58) Field of Classification Search
None
See application file for complete search history.

(56) References Cited

U.S. PATENT DOCUMENTS

| 11,657,503 | B2 * | 5/2023 | Chukka .................. G06T 7/0012 |
| | | | 382/133 |
| 2020/0371333 | A1 | 11/2020 | Amthor et al. |
| 2022/0058369 | A1 * | 2/2022 | Alahmari .............. G06F 18/285 |

FOREIGN PATENT DOCUMENTS

DE    102019114012 A1    11/2020

OTHER PUBLICATIONS

Gupta, Shashank, and Sumohana S. Channappayya. "Perceptually driven conditional GAN for fourier ptychography." 2019 53rd Asilomar Conference on Signals, Systems, and Computers. IEEE, 2019. (Year: 2019).*
Tom, Francis, et al. "Learning a deep convolution network with turing test adversaries for microscopy image super resolution." 2019 IEEE 16th International Symposium on Biomedical Imaging (ISBI 2019). IEEE, 2019. (Year: 2019).*

(Continued)

*Primary Examiner* — Matthew C Bella
*Assistant Examiner* — Johnny B Duong
(74) *Attorney, Agent, or Firm* — LaBatt, LLC

(57) ABSTRACT

In a method for evaluating image processing results, at least two microscope images that show the same structure are received. Each of the microscope images is processed by means of an image processing algorithm for calculating a respective image processing result. At least one confidence score of the image processing results is determined based on a degree of correspondence between the image processing results calculated from different microscope images.

20 Claims, 7 Drawing Sheets

(56) References Cited

OTHER PUBLICATIONS

Plummer, Bryan A., et al. "Why Do These Match? Explaining the Behavior of Image Similarity Models." arXiv.Org, May 26, 2019, https://arxiv.org/abs/1905.10797v2. (Year: 2019).*

Xue, Yujia, et al. "Reliable deep-learning-based phase imaging with uncertainty quantification." Optica 6.5 (2019): 618-629. (Year: 2019).*

Pollard, David. "Statistics 101-106: Lecture 5". http://www.stat.yale.edu/~pollard/Courses/100.fall98/pollard/lecture5.pdf. Oct. 6, 1998. (Year: 1998).*

Simonson, Katherine M., Steven M. Drescher, and Franklin R. Tanner. "A statistics-based approach to binary image registration with uncertainty analysis." IEEE Transactions on Pattern Analysis and Machine Intelligence 29.1 (2007): 112-125. (Year: 2007).*

Xue, Yujia, et al. Reliable deep-learning-based phase imaging with uncertainty quantification. Optica, May 2019, vol. 6, No. 5, pp. 618-629.

Liu, Rongrong, et al. Deep spectral learning for label-free optical imaging oximetry with uncertainty quantification. Light: Science & Applications, 2019, vol. 8, No. 1, pp. 1-13.

Data Augmentation, printed from https://en.wikipedia.org on Nov. 20, 2021, 2 pages.

Wang, Hongda et al. Deep learning achieves super-resolution in fluorescence microscopy. bioRxiv preprint doi: https://doi.org/10.1101/309641. 29 pages.

Weigert, Martin et al. Content-Aware Image Restoration: Pushing the Limits of Fluorescence Microscopy. bioRxiv preprint doi: https://doi.org/10.1101/236463. Jul. 3, 2018, 17 pages.

English translation of Search Report for DE 10 2021 100 444.6, Sep. 24, 2021, 8 pages.

\* cited by examiner

MICROSCOPY SYSTEM AND METHOD FOR EVALUATING IMAGE PROCESSING RESULTS

REFERENCE TO RELATED APPLICATIONS

The current application claims the benefit of German Patent Application No. 10 2021 100 444.6, filed on 12 Jan. 2021, which is hereby incorporated by reference.

FIELD OF THE DISCLOSURE

The present disclosure relates to a microscopy system and a method for evaluating image processing results.

BACKGROUND OF THE DISCLOSURE

Microscope images captured by a microscopy system typically undergo processing by image processing programs. The generated image processing results can generally be a result image or some other result, for example a classification of an object visible in the microscope image. Models learned with training data are being utilized more and more frequently, e.g., for resolution enhancement, noise reduction or for generating a segmentation mask in which a pixel-by-pixel evaluation of the presence of predetermined object types is performed. In this connection, it is not only desirable to be able to achieve precise results, but to further be able to make statements about the certainty or reliability of a result.

For example, the hallucination of objects or structures not in the original microscope image in the course of resolution enhancement is a known problem of learned models. This problem is observed, for example, in the article "Deep learning achieves super-resolution in fluorescence microscopy", Hongda Wang et al., bioRxiv 309641; doi: https://doi.org/10.1101/309641, which describes the training of a generative adversarial network (GAN) to calculate a high-resolution fluorescence image. It is proposed that, if invented/hallucinated objects are determined in the calculated result image, this should be additionally penalized in the loss function or that a further regularization should be performed to prevent such artefacts in the future. However, an evaluation of whether or not novel input images produce erroneous results must ultimately be carried out by a human being.

In order to detect certain types of error results of an image processing program, the Applicant developed a verification model—described in DE102019114012—to which an image processing result is fed. The verification model can be a model learned using training data, wherein the training data contains, e.g., image processing results that are labelled as correct or as incorrect. By means of such training, the verification model is able to identify certain types of erroneous image processing results.

M. Weigert et al., in "Content-Aware Image Restoration: Pushing the Limits of Fluorescence Microscopy", Nature Methods, 2018, Volume 15, No. 12, p. 1090 or also in bioRxiv preprint, doi: https://doi.org/10.1101/236463; 3 Jul. 2018, describe different strategies for indicating or improving the reliability of a processing result. In particular, a segmentation model is modified so as to calculate a probability distribution of a segmentation result for each pixel. This document also describes the use an ensemble of a plurality of similar learned models. A difference in the results of these models can be interpreted as an uncertainty of the result. For example, each model of the ensemble can perform an image segmentation and the results of the models are compared for a certain pixel. It poses a problem, however, that it is not possible to ascertain if the same error is being committed by a plurality of models of the ensemble. If the models are trained with a similar learning algorithm using similar training data, it can occur that a majority of the models reach an inaccurate image processing result. There is thus an ongoing need to be able to evaluate the quality of an image processing in a manner that is as reliable as possible.

SUMMARY OF THE DISCLOSURE

It can be considered an object of the invention to provide a microscopy system and a method which can evaluate the certainty of an image processing result in a manner that is as sound as possible.

This object is achieved by means of the method with the features of claim 1 and by means of the microscopy system with the features of claim 16.

In a method for evaluating image processing results according to the invention, at least two microscope images that show the same structure are received or acquired. Each of the microscope images is processed with an image processing algorithm, which calculates respective image processing results. At least one confidence score of the image processing results is determined by a degree of correspondence between the image processing results calculated from different microscope images.

A microscopy system according to the invention comprises a microscope with a camera for capturing microscope images, in particular an overview camera or sample camera. The microscopy system further comprises a computing device, which is configured to calculate an image processing result from at least one microscope image by means of an image processing algorithm. The computing device is also configured to calculate at least one confidence score for the image processing result. To this end, the computing device respectively processes at least two microscope images showing the same structure by means of the image processing algorithm and thus calculates respective image processing results; the computing device then determines the at least one confidence score based on a degree of correspondence between the image processing results calculated from different microscope images.

The described procedure can be based on two or more microscope images that essentially show a corresponding content and that only differ, e.g., in terms of random image noise. An image processing algorithm should consequently calculate essentially the same result for each of the microscope images. If the level of correspondence between the image processing results is low, however, this can be interpreted as a higher level of uncertainty, i.e. reflecting a lower confidence score, of the image processing results or one of the image processing results. In contrast to methods of the prior art, the confidence score can represent a variance in the image processing results caused by the noise in the microscope images. The procedure differs from the ensemble model described in the foregoing in that, instead of different models processing the same input image, one and the same model processes different input images. With some noise patterns, a plurality of models of an ensemble can produce the same erroneous result. As a consequence, this situation cannot be detected by an ensemble; however, it can be detected by assessing a plurality of different microscope images. A model capable of calculating a probability distribution for each pixel was also cited in the foregoing; in this case, the information pertaining to the distribution is already part of the learned model while, in the present invention, the processing of different similar microscope images yields a distribution of results. For example, if the microscope images only differ in terms of random image noise and the image processing algorithm still ends up with different results, an erroneous processing can be inferred and the invention determines a low level of confidence in the results.

Unlike the aforementioned ensemble models or the cited models that calculate a probability distribution for each pixel, the determination of a confidence level in accordance with the invention is not limited to image processing algorithms implemented in the form of models learned using training data.

Optional Embodiments

Variants of the microscopy system according to the invention and of the method according to the invention are the object of the dependent claims and are explained in the following.

Microscope Images

The microscope images can be, for example, images captured in succession with identical microscope settings. The microscope images thus essentially differ in random image noise only. If the random image noise of the microscope images leads to different image processing results, the result can be considered random and thus unreliable. Alternatively, the microscope images can also be calculated from the same raw image, e.g., by repeatedly adding different artificial random image noise to the same raw image.

In other words, the microscope images acting as the input images of the image processing algorithm can show the same scene and can differ in terms of random image noise. The microscope images can correspond to different raw images, in particular captured in immediate succession. The raw images each show the same structure and differ in random image noise. The raw images can be captured with exactly the same microscope parameters, in particular with the same illumination power, illumination wavelength(s), pixel dwell time, camera sensitivity and/or camera exposure time. Alternatively, one or more microscope parameters can be varied between the capture of the respective microscope images or their underlying raw images. The variation can be slight, e.g. 10% or less of the value in question, i.e., for example, a variation of the illumination power of less than 10%. In any case, the same sample area, the same scene or the same structure is depicted in the different images. The field of view of the camera relative to the scene being analyzed can be identical for the plurality of microscope images or vary only slightly as mentioned, in particular by less than 10%.

At least two of the microscope images can also be based on the same raw image and differ (solely) by a performed image manipulation. The image manipulation can be, e.g., an adding of artificial image noise. Such an image manipulation can be carried out repeatedly on a raw image in order to obtain a plurality of different microscope images. The raw image without any image manipulation can also function as one of the microscope images entered into the image processing algorithm. Any number of similar microscope images can thus be generated for the image processing algorithm based on a single raw image.

Combinations of the described methods are also possible. For example, two or more raw images with random differences in image noise can be captured; in turn, a plurality of microscope images can subsequently be generated from one of these raw images or from each of these raw images by means of image manipulation.

The image manipulation is intended to maintain essentially the same image content so that in a desired scenario the image processing algorithm delivers corresponding results regardless of the slight image manipulation. In particular, the performed image manipulation can comprise one or more of the following operations:

Adding image noise. Different microscope images can be generated by means of different noise. Artificial image noise changes pixels of an image in a random manner, whereby no new image content is added, in particular no new structures.

Mirroring and/or rotating image content. If the image content of a raw image is rotated by different angles, a plurality of microscope images with identical (except for the angle of rotation) image content can be generated. Optionally, the microscope images can be cropped to avoid any blank areas that can occur when a rectangular image is rotated. A reflection can be a point reflection or an axis reflection.

Excising (cutting out) or replacing image content. A subsection of a raw image, for example a few pixels or less than 1% of all pixels, can be removed or filled in based on the surrounding image content. Different microscope images with almost identical image content can thereby be generated.

Condensing or stretching image content. For example, a raw image can be scaled slightly in one or two image directions, for example by a factor between 0.9 and 1.1. If an image processing algorithm is intended to count biological cells or cell organelles in the microscope image, the same number of cells or cell organelles should always be counted regardless of a slight condensing of the image.

Deforming and subsequently restoring image content. A raw image can be, e.g., condensed and then stretched back to its original form or its scaling can be altered and then changed back again. The result has essentially the same image content as the original image, although adjacent pixels can be smeared into each other.

Blurring or sharpening image content. The blurring or sharpening can be slight so that the visible image content remains essentially the same. In particular, the blurring or sharpening can occur by sliding a simple convolution matrix over the raw image without the use of machine learning models, which could potentially distort content during image sharpening.

Modifying brightness, tonal values or contrast. By means of a plurality of different such settings, once again essentially any number of microscope images can be generated from the same raw image. Modifying the tonal values can in particular produce a spreading or an equalization of tonal values. In the case of images with a plurality of color channels, any number of these channels can be varied.

Modifying image resolution. It is also possible to generate one or more microscope images from a raw image by means of a modification of the image resolution or image size, optionally with a subsequent conversion back to the original resolution or size.

The aforementioned image manipulations can relate to the image content of an entire raw image or only to a part of the same. For example, it is also possible for image noise to be added or modified in one image area only. Different image areas of the same raw image can be selected for an image manipulation so as to generate different microscope images. Different microscope images can also be generated by applying different image manipulations from among those cited above to the same raw image.

Image Processing Algorithm

The image processing algorithm processes input data in a complex manner so that in particular a simple propagation of error does not allow a statement as to how statistical fluctuations in the input data affect image processing results.

The input data of the image processing algorithm can generally contain one or more images, e.g., a 3D stack of images at different heights. Optionally, the image processing algorithm can also be designed to take further input data into account in the calculation of the image processing result, e.g., contextual information relating to objects that appear in the image or capture parameters or system information of the microscope.

The image processing algorithm can be based on a classic image processing method that does not comprise a learned model, e.g., a 3D block-matching or similar method for image denoising, or Wiener deconvolution for deconvolution and image sharpening.

Alternatively, the image processing algorithm can be or comprise a trained machine learning model. The latter calculates an image processing result from each of the microscope images (independently of the other microscope images or other microscope image). The machine learning model can calculate an image-to-image mapping, i.e., generate an output image or result image. This can occur, e.g., by means of a convolutional network, especially a U-Net, by means of GANs (generative adversarial networks) or by means of an FCN (fully convolutional network).

If the image processing algorithm respectively calculates an image processing result in the form of a result image from each microscope image, this can occur by means of one or more of the following operations: a denoising, a deconvolution, a resolution enhancement, an artefact removal, a filling of image regions and holes, a mapping/conversion to another microscopy contrast method; a segmentation or an object detection. By means of a segmentation, for example, a segmentation mask or binary mask, in which different pixel values symbolize different determined objects, is calculated from a noisy image of a sample. In the case of an artefact removal, certain structures or objects are removed from the image content, e.g., reflections or image defects created by a previous image processing process. Mapping to another microscopy contrast method can mean, e.g., that an input image such as a DPC image (differential phase contrast image) is converted to a representation similar to a DIC image (differential interference contrast image). Virtual staining is also possible, wherein an input image is, e.g., a captured image of a sample in bright-field contrast and a result image shows the sample according to a representation in fluorescence contrast.

In the case of a deconvolution, a known PSF (point spread function) of the microscope used to create the input image can be taken into account in order to calculate a deconvolved result image with a higher resolution. The image processing algorithm can also be designed to calculate a complete image from an image captured with missing image regions according to compressed sensing methods.

The image processing algorithm can also be designed to calculate another quantity instead of a result image, in particular a number that can assume continuous values and/or a classification result. A classification result can discriminate, for example, between different classes of sample carriers or between different classes of samples, in particular different biological cell types. A continuous value can relate, for example, to a geometric variable, e.g., a height, position or orientation of a sample, sample carrier, sample receptacle of a sample carrier, or holding frame for a sample carrier. The image processing algorithm can also be designed to count specific objects or structures in the microscope image, e.g., biological cells or specific cell parts.

Degree of Correspondence and Confidence Score

The degree of correspondence is a measure of how similar the image processing results are. For example, the degree of correspondence can be or be based on—and is in particular a monotonic function of—a difference between image processing results, a variance or some other statistical measure of deviation, e.g., the average absolute deviation or standard deviation of the image processing results. A sole degree of correspondence can be calculated for the image processing results (e.g. in the case of classification results) or a plurality of degrees of correspondence can be calculated for the image processing results, e.g., a degree of correspondence for each pixel in cases where the image processing results take the form of result images. For result images, generally speaking, it is possible to determine either an overall degree of correspondence or respective degrees of correspondence for each image area, wherein an image area comprises one or more (in particular adjacent) pixels. Alternatively, a number, shape and/or size of certain objects or structures in the result images can be taken into account as a degree of correspondence between result images. For example, if microscope images are segmented by the image processing algorithm, the segmentation discriminating between biological cells and a background, the degree of correspondence can be calculated based on the number, shape and/or size of the biological cells indicated in the segmentation masks.

In one example, an algorithm that counts the number of microtubules of a cell in the result images is run in order to take into account a degree of correspondence. If, for example, a denoising algorithm calculates, based on microscope images, result images that exhibit different microtubule structures, the number of countable microtubules will likewise differ. Generally speaking, it is possible for a subsequent algorithm to make a quantitative statement about result images of the image processing algorithm and the degree of correspondence of these quantitative statements is then taken into account.

The confidence score or confidence level can be equal to or determined as a function of the degree of correspondence. If the image processing results take the form of result images, a confidence map can be generated by respectively determining the confidence score for different image pixels or image areas of the result images. The confidence scores in this scenario can be pixel values of the confidence map. The confidence score relates to the degree of similarity of locationally corresponding pixels or image areas of the different result images. The confidence map thus indicates for different areas of a result image how reliable the result of the image processing algorithm is.

For an informative representation of a confidence map, one of the result images can be superimposed with the confidence map by expressing, e.g., image information of the result value as a brightness of a pixel and a value of the confidence map as a color tone or color saturation of the pixel.

Optionally, a confidence score machine learning model can also receive the image processing results as inputs and calculate the at least one confidence score as an output therefrom. The inputs of the confidence score machine learning model can also be data derived from the image processing results, e.g., values expressing a difference or variance between the latter. The confidence score machine learning model can be learned using training data comprising a plurality of sets of image processing results, wherein associated degrees of correspondence or confidence scores are specified as target data/annotations. For example, the degrees of correspondence or confidence scores can be evaluated manually by a user. This can be advantageous, e.g., for image processing results in the form of segmentation masks: if the segmentation masks differ in a certain number of pixels but do not differ in the number or rough shape of segmented objects, a user can evaluate this scenario to have a high confidence score. If, on the other hand, the segmentation masks differ in the same number of pixels but display different numbers of segmented objects or object shapes that differ significantly between the segmentation masks, then a user can evaluate this scenario to have a low confidence score.

In a further example of image processing results in the form of result images, a user annotates which image areas correspond sufficiently and which image areas differ critically. The confidence score machine learning model thus learns to evaluate for input images which of their image areas are sufficiently similar to one another (i.e. are awarded a high level of confidence) and which image areas differ from one another to a greater degree so that they are awarded a low level of confidence. This makes it possible to detect and/or localize problematic image areas.

Follow-Up Actions Based on the Confidence Score

If a confidence score for the image processing results exceeds a predefined tolerable threshold value, a warning can be output, a supplemental processing of an image processing result can be initiated or a new data capture can occur in order to generate more suitable microscope images.

If a determined confidence score for an image area exceeds a predefined threshold value or if confidence scores for a plurality of image pixels of an image area exceed a predefined limit value, in particular one or more of the following processes can be carried out:

The image area can be analyzed by means of the capture of a new image. In particular, only the image areas with an insufficient confidence score are analyzed in this scenario.

The image area can be labelled with a warning, for example in the form of a visual representation in one of the microscope images or result images.

The image area can be provided with artificial noise or its image resolution can be reduced, i.e. it can be pixelated. This indicates low confidence and, moreover, prevents incorrect conclusions from being drawn from the questionable information of the corresponding image area in a subsequent image analysis.

The image area can also be filled in with image information from the microscope images or from one of the microscope images. For example, if the image processing algorithm calculates denoised result images and one image area differs between the result images to an excessive degree, the content of this image area can be replaced based on the corresponding image content of one or more of the microscope images.

The aforementioned image area relates to one of the result images of the image processing algorithm or alternatively to an image formed from a plurality of the result images, for example, by averaging the result images.

Alternatively, it can be determined how one or more image processing parameters of the image processing algorithm are to be modified as a function of the confidence score. A new processing of the microscope images or one of the microscope images is then carried out by the image processing algorithm with the one or more modified image processing parameters.

Additionally or alternatively, it is possible to derive modifications to the image processing algorithm from the confidence score and associated image processing results in order to make the algorithm more robust vis-à-vis noisy input data. For example, if the image processing algorithm comprises a machine learning model, the latter can be re-trained. A re-training can relate in particular to those structures for which an insufficient confidence level was determined. It is also possible to capture new raw images/microscope images and to add these to the training data. The new captured images can again show those structures for which an insufficient level of confidence was determined. Alternatively or additionally, the confidence map can be used for a preliminary evaluation of whether the image processing algorithm is suitable for the captured structure and/or whether a re-training of an image processing algorithm formed with a trained machine learning model should occur. If, for example, the confidence map shows a high confidence level/a high correspondence score for some image regions and a lower confidence level for other image regions, then the image processing algorithm can be evaluated as essentially suitable while a re-training is recommended for the image regions with a lower confidence level. Such a recommendation can be output to a user. If, on the other hand, the confidence map shows an insufficient confidence level for all image regions (or a predetermined minimum proportion of the confidence map), then the determined evaluation can be that the image processing algorithm is unsuitable for the structures being analyzed.

Learning of a Model to Map a Microscope Image to a Confidence Score/Confidence Map Using the microscope images and associated calculated confidence scores, it is also possible to create training data for learning a model that infers a confidence score directly from one or more microscope images. This confidence score constitutes a statement regarding the reliability of an image processing algorithm with respect to the microscope image without the image processing algorithm actually having to process the microscope image.

In order to create the training data, the steps already described in the foregoing are first carried out for a plurality of sets of microscope images. That is to say that the operations of processing microscope images in order to calculate image processing results and determining at least one confidence score for those image processing results are repeated for different sets of microscope images. For example, it is possible to use 1000 sets consisting of 10 microscope images each, wherein all microscope images of the same set respectively show the same structures and differ, e.g., in terms of their image noise. The sets of microscope images (or parts thereof) can now be used as training data of a machine learning model, wherein the associated confidence scores are used as target data in a training of the machine learning model. The machine learning model is trained in this manner to calculate a mapping to at least one confidence score from a microscope image or from a plurality of microscope images. If the microscope images are processed, for example, into result images and a confidence map is calculated for each set of result images, then it is possible to learn a model that determines a confidence map directly from a microscope image. The model will typically learn to detect structures to which the response of the image processing algorithm in question is particularly fragile or stable. The machine learning model for determining a confidence score thus relates to a specific image processing algorithm. If different image processing algorithms are to be covered, training data can be generated for each of the image processing algorithms as described in the foregoing. In the training, the image processing algorithm used can be taken into account as contextual information. If an indication of the image processing algorithm that is to process a microscope image is also entered into the fully trained model, the model can calculate a confidence score for this image processing algorithm and this microscope image.

The invention also relates to a method for evaluating image processing results using a machine learning model trained in one of the ways described in the foregoing. In the method, an image processing algorithm calculates an image processing result for an entered microscope image. The same microscope image is also input into the machine learning model, which calculates at least one confidence score for the microscope image.

Such an approach can be advantageous when it is not intended to use the image processing algorithm in question frequently. This can be the case, e.g., in cases where the processing time is long or when the sample would be subjected to too much stress, for example when the microscope images are generated by optical acquisition methods with a high illumination intensity.

General Features

A microscopy system denotes an apparatus that comprises at least one computing device and a microscope. A microscope can be understood to be in particular a light microscope, an X-ray microscope, an electron microscope or a macroscope.

The computing device can physically be a part of the microscope and be arranged separately in the vicinity of the microscope or at a remote location at any distance from the microscope. The computing device can also be designed to be decentralized. It can generally be formed by any combination of electronics and software and comprise in particular a computer, a server, a cloud-based computing system or one or more microprocessors or graphics processors. The computing device can also be configured to control the sample camera, the overview camera, image capture, the sample stage drive and/or other microscope components.

The sample can be any sample and can comprise, for example, biological cells or cell parts, material or rock samples, electronic components and/or objects held in a liquid.

A microscope image in the present disclosure can be essentially any raw image captured by a microscope or a processed image. The processed image can be derived from one or more raw images or from pre-processed images of a microscope. For example, a microscope image can be an image that has undergone a perspective transformation and the image processing algorithm calculates a geometric variable such as a sample carrier height from this image. The microscope image can be made up of a plurality of raw images joined together when the raw images show sample areas that overlap one another laterally.

An overview camera for capturing an overview image can be provided in addition to a sample camera with which images of a sample area are captured with a higher magnification. The aforementioned camera is to be understood as at least one camera, which can be an overview camera and/or a sample camera. The overview camera can be mounted on a stationary device frame, e.g. a microscope stand, or on a movable component, e.g. a sample stage, focus drive or objective revolver. An image processing of the data captured by the at least one camera can optionally already have occurred for the microscope images and raw images mentioned in the present disclosure, for example a homographic or perspective mapping, an image stitching, an image segmentation, or a brightness adjustment or contrast adjustment. Receiving an image can comprise in particular the loading of an existing image from a memory or the capture of an image with a camera.

A computer program according to the invention comprises commands that cause the execution of one of the described method variants when said method variants are executed by a computer.

The learned models or machine learning models described in the present disclosure respectively denote a model learned by a learning algorithm using training data. The machine learning models can, for example, respectively comprise one or more convolutional neural networks (CNNs), which receive at least one input image as input, in particular an overview image, a sample image or images calculated therefrom. The training of a machine learning model can have been carried out by means of a supervised learning process in which training microscope images with an associated annotation/labelling were provided. A learning algorithm is used to define model parameters of the machine learning model based on the annotated training data. A predefined objective function can be optimized to this end, e.g. a loss function can be minimized. The loss function describes deviations between the predetermined labels and current outputs of the machine learning model, which are calculated with the current model parameter values from entered training data. The model parameter values are modified to minimize the loss function, said modifications being calculated e.g., by gradient descent and backpropagation. In the case of a CNN, the model parameters can in particular include entries of convolution matrices of the different layers of the CNN. Other deep neural network model architectures are also possible instead of a CNN. Instead of a supervised learning process, it is also possible to carry out an unsupervised training in which an annotation of the training images does not occur. A partially supervised training or reinforcement learning is also possible.

The characteristics of the invention that have been described as additional apparatus features also yield, when implemented as intended, variants of the method according to the invention. Conversely, a microscopy system can also be configured to carry out the described method variants. In particular, the computing device can be configured to carry out the described method variants and/or output commands for the execution of described method steps. The computing device can also comprise the described computer program. While a ready-trained machine learning model is used with some variants, other variants of the invention result from the implementation of the corresponding training steps.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Different example embodiments are described in the following with reference to the figures. As a rule, similar elements and elements that function in a similar manner are designated by the same reference signs.

FIG. 1

Figure 1:
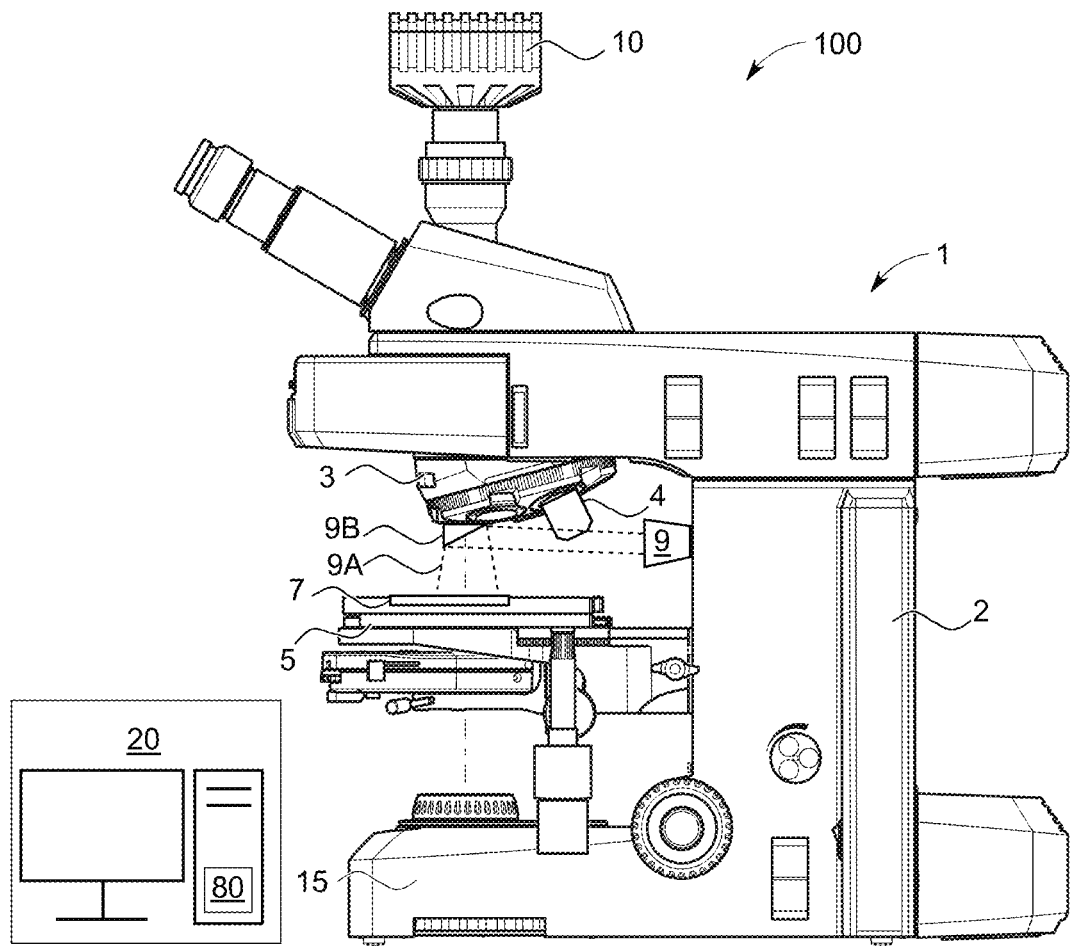
FIG. 1 is a schematic illustration of an example embodiment of a microscopy system of the invention.

FIG. 1 shows an example embodiment of a microscopy system 100 according to the invention. The microscopy system 100 comprises a computing device 20 and a microscope 1, which is a light microscope in the illustrated example, but which can essentially be any kind of microscope. The microscope 1 comprises a stand 2 via which further microscope components are supported. The latter can in particular include: an illumination device 15; an objective changer/revolver 3, on which an objective 4 is mounted in the illustrated example; a sample stage 5 with a holding frame for holding a sample carrier 7, and a microscope camera 10. If the objective 4 has been rotated so as to be located in the microscope light path, the microscope camera 10 receives detection light from a sample area, in which a sample can be located, in order to capture a sample image. A sample can be any object, fluid or structure. The microscope 1 also comprises an overview camera 9 for capturing an overview image of a sample environment. The overview image can thus show in particular the sample carrier 7 or a part of the same. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. In variants of this embodiment, the mirror or some other deflection element can also be arranged at a different site. Alternatively, the overview camera 9 can also be arranged on the stand 2, objective revolver 3 or sample stage 5 so as to view the sample carrier 7 directly without a mirror 9B. In principle, it is also possible for the microscope camera 10 to function as an overview camera when a different objective, in particular a macro-objective, is selected via the objective revolver 3 for the capture of an overview image.

A microscope image can be understood in the present disclosure as an overview image or sample image. The microscope image can correspond to captured raw data or be formed by means of a processing of the raw data. The computing device 20 comprises a computer program 80 with an image processing algorithm for processing at least one microscope image. The computing device 20 or the computer program 80 is configured to execute one of the following examples of a method according to the invention.

Figure 2:
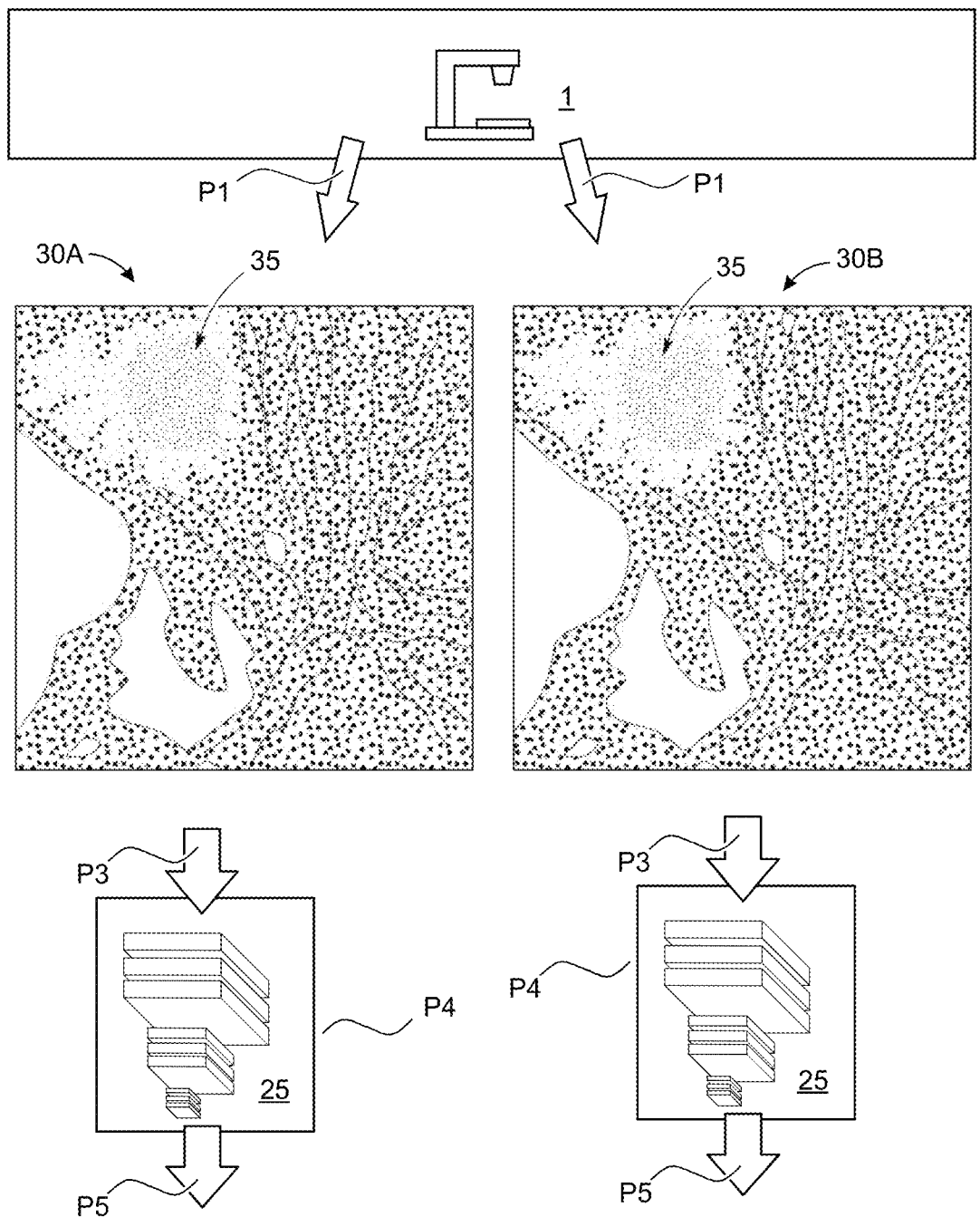
FIG. 2 schematically shows processes of an example embodiment of a method of the invention.
Figure 3:
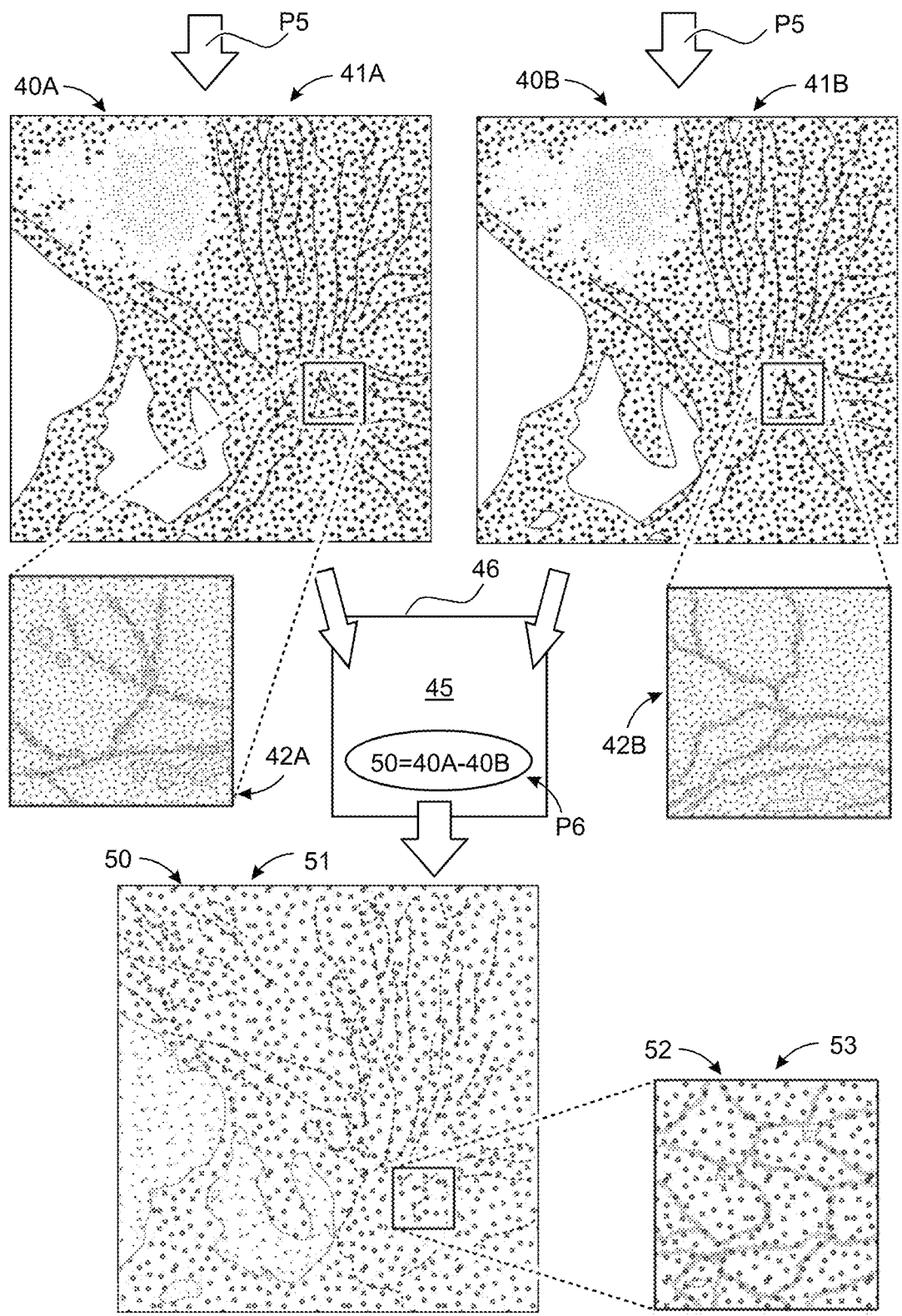
FIG. 3 is a continuation of FIG. 2.

FIGS. 2 and 3

FIGS. 2 and 3 schematically show a sequence of an example embodiment of the method of the invention.

In process P1 of FIG. 2, a microscope 1 captures a plurality of microscope images 30A, 30B showing the same structure 35. The fields of view can be identical during the capture of these images and microscope parameters can also be identical so that the microscope images 30A, 30B should be identical except for random image noise. The illustrated structures 35 in this case comprise a cell area with a cell nucleus and filamentous microtubules. All of the microscope images 30A, 30B show these structures 35, optionally also at corresponding locations within the images.

In process P3, the microscope images 30A, 30B are respectively fed to the same image processing algorithm 25. Optionally, the microscope images 30A, 30B can be pre-processed microscope images, i.e., they do not have to be raw images of the microscope 1. In the optional pre-processing, the microscope images 30A, 30B can be processed in an identical manner. The image processing algorithm 25 now processes the input images, i.e., the microscope images 30A, 30B, in process P4. For example, a deconvolution can be performed to remove any blurring associated with the PSF of the optical transfer of the microscope 1 in order to obtain a result image with a higher resolution. The image processing algorithm 25 can also be a model learned using training data and intended to calculate, e.g., a noise reduction or resolution enhancement.

In process P5, the image processing algorithm 25 outputs an image processing result 40A-40B for each microscope image 30A, 30B, as shown in FIG. 3. Each image processing result 40A-40B is a result image 41A-41B that has, for example, a higher resolution than the underlying microscope image 30A or 30B. It poses a problem, however, if errors have occurred in the course of the image processing of process P4, in particular if structural details have been added that were not included in the original microscope image 30A, 30B. This risk exists, e.g., when the image processing algorithms are implemented in the form of machine learning models, in particular when the microscope images 30A, 30B differ significantly from training data of the machine learning model. Section 42A is an enlarged section of the result image 41A and section 42B is an enlarged section of the result image 42A. The sections 42A, 42B correspond in terms of their position and should thus show the same structures. This is, however, not the case in the illustrated example. The differences here are not exclusively attributable to a random image noise that distinguishes the microscope images 30A, 30B; instead, the image processing algorithm 25 has hallucinated details into one or both of the result images 41A-41B. A high image resolution, high definition and low image noise level of the result images 41A-41B can simultaneously give a false sense of security in the reliability of these details.

Conventionally, some image processing algorithms also indicate a level of reliability or confidence for a result image they have generated. In such cases, however, even when a high level of reliability is indicated by the image processing algorithm, a random, slightly different image noise (such as between the microscope images 30A-30B) can still potentially lead to a completely different result. In order to resolve this issue, the result images 41A-41B are entered together into a confidence level calculation program 45. The confidence level calculation program 45 considers a degree of correspondence between the result images 41A-41B, for example, by calculating a difference between the result images 41A-41B pixel by pixel, process P6. If the result images 41A-41B essentially correspond, the difference is close to zero so that a high confidence score is output. However, if the result images 41A-41B differ significantly from each other, as in the sections 42A and 42B, then the differences are larger and the confidence score is accordingly lower. In the example shown, the confidence level calculation program 45 outputs a confidence score 50 for each pixel, thus forming a confidence map 51. An enlarged section 52 of the confidence map 51 indicates the differences between the sections 42A and 42B.

The confidence score thus gives an indication of how strongly the performed image processing is influenced by small random changes in an input image. The calculated confidence score differs in this respect from confidence levels determined conventionally, such as those cited in the introduction in relation to the relevant prior art.

It is possible to identify image areas 53 in which the confidence score exceeds a predefined threshold limit in the confidence map. A new image capture can then occur for corresponding areas of the underlying microscope image 30A and/or 30B in order to achieve a better confidence level.

Instead of a straightforward calculation of the difference between the result images 41A-41B, it is also possible to calculate a degree of correspondence between these images in some other way. To this end, the confidence level calculation program 45 can optionally be designed as a confidence score machine learning model 46.

A variation of the example embodiment described in relation to FIGS. 2 and 3 is described in the following with reference to FIG. 4.

FIG. 4

Figure 4:
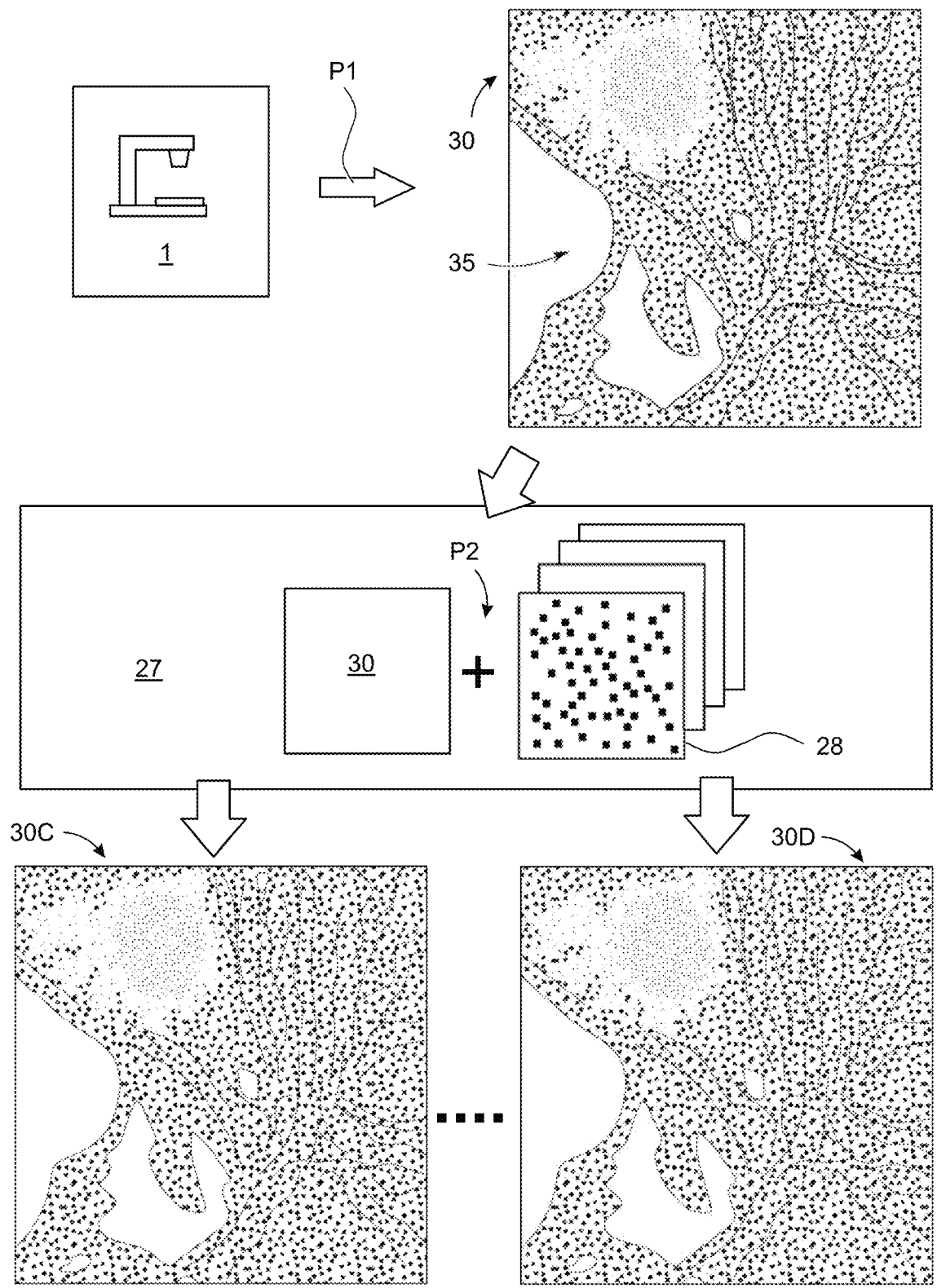
FIG. 4 schematically shows alternative processes to those of FIG. 2 according to a further example embodiment of a method of the invention.

FIG. 4 shows processes of a further example embodiment of a method according to the invention. In this case, the microscope 1 only generates a single microscope image or raw image 30 for a structure 35 in process P1. A plurality of microscope images 30C-30D are calculated from this raw image 30, the calculated images 30C-30D, like the microscope images 30A-30B, differing only slightly from one another. To this end, the raw image 30 is fed to a manipulation program 27 which, in process P2, processes the raw image 30 a number of times in different ways so as to calculate different microscope images 30C-30D. In the example shown, the manipulation program 27 adds image noise 28 to the raw image 30. The image noise 28 is randomly generated so that different image noise 28 can be added to the raw image 30 a number of times in order to generate a plurality of microscope images 30C-30D which differ in terms of random noise.

The microscope images 30C-30D can now be processed in the same manner as described with reference to FIGS. 2 and 3 for the microscope images 30A-30B. This way, a confidence score 50 or a confidence map 51 can be calculated based on a single raw image/microscope image captured by the microscope.

The intensity of the image noise 28 can optionally be selected as a function of an image noise in the raw image 30. To this end, a noise intensity score is first determined in the raw image 30. The random image noise 28 is then selected so that it is smaller or less intense than the image noise in the raw image 30. This ensures that the added image noise 28 does not distort the raw image 30 and that the calculated confidence level does not end up indicating, for example, an extent to which the original raw image 30 has been distorted.

Instead of noise addition, the manipulation program 27 can alternatively be designed for some other image manipulation by means of which a plurality of similar microscope images are generated. For example, the image content of the raw image 30 can be rotated by different angles in order to generate a plurality of microscope images. It is also possible to shift the image content of the raw image 30 in various ways in order to generate a plurality of microscope images. The basic raw image 30 can also be used as one of the microscope images processed by the image processing algorithm 25. The calculated result images can then be manipulated in reverse (e.g., their image content can be rotated or shifted back to its original position) before they are fed to the confidence level determination program '45. Other possible image manipulations are, e.g., a stretching or condensing of the image content, a removal of individual pixel values or a replacement of individual pixel values with surrounding information.

The described variants for determining a confidence score can also be used to generate training data for a further machine learning model, as discussed in the following.

Figure 5:
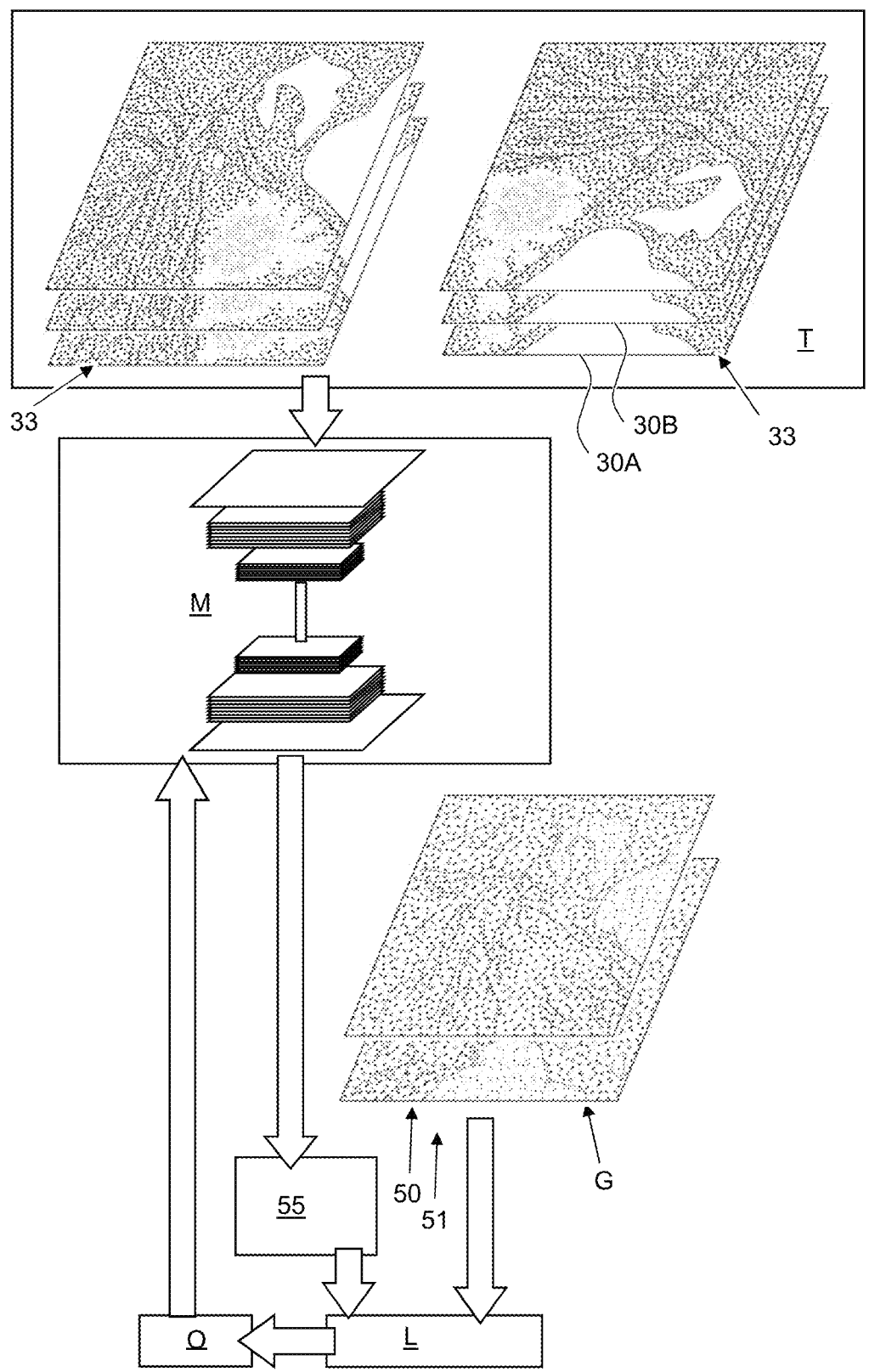
FIG. 5 schematically shows a training of a machine learning model according to the invention.
Figure 6:
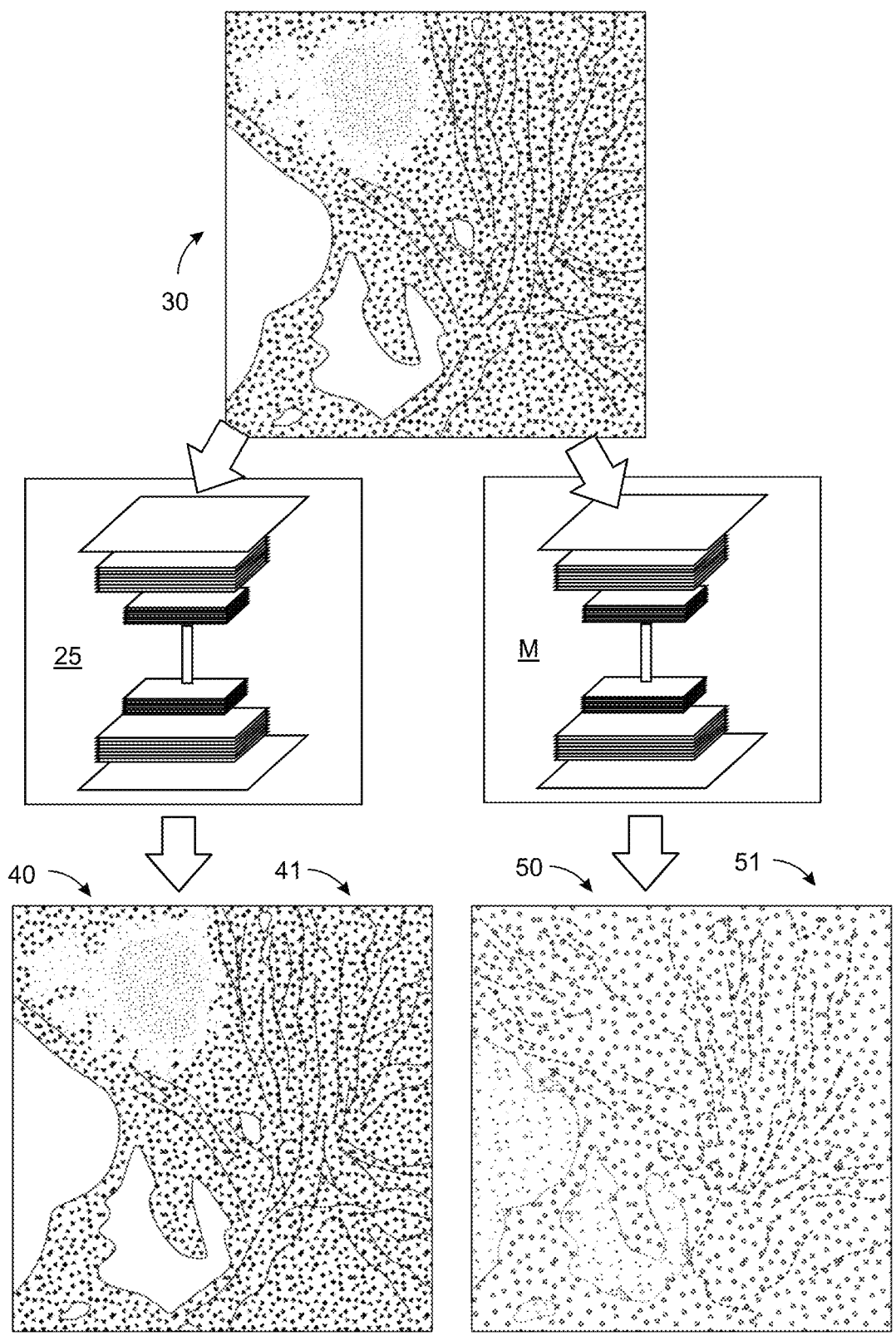
FIG. 6 schematically shows the application of the machine learning model of FIG. 5.

FIGS. 5 and 6

The sequence of a training of a machine learning model M is first described with reference to FIG. 5 before the application of the machine learning model M is subsequently illustrated with reference to FIG. 6. The machine learning model M is learned in a supervised training using training data T for which target data G has been determined. The training data T comprises a plurality of sets 33 of microscope images 30A, 30B. The microscope images of all sets 33 have been processed with the image processing algorithm 25 in one of the described ways and a confidence map 51 or at least one confidence score 50 has respectively been determined for each of the sets 33. These confidence scores 50 or confidence maps 51 are specified in the training of the machine learning model M as target data G or "ground truth". The machine learning model M thereby learns a mapping from a microscope image to be input into the image processing algorithm to a confidence score or confidence map. The confidence score expresses how certain an image processing result generated by the image processing algorithm 25 for the microscope image in question is likely to be.

By means of the machine learning model M, the image processing algorithm 25 thus only has to process a microscope image once. A plurality of similar processing operations for determining a confidence score is thereby rendered redundant.

The training of the machine learning model M can essentially occur in any manner using said training data T and associated target data G. Moreover, in principle any model architecture can be implemented. In the illustrated case, the machine learning model M comprises a deep neural network, e.g., in the architecture of a convolutional neural network. By means of the training, model parameter values of the machine learning model M are iteratively adjusted, for example values of kernels of a CNN. Based on its current model parameter values, the machine learning model M calculates an output 55 for each of the microscope images of the training data T. In this example, the output 55 is an image that is intended to represent a confidence map. A loss function L captures a difference between the outputs 55 and the predetermined target data G. Based on the loss function L, a predetermined optimization function O determines how the model parameter values are to be iteratively modified in order to minimize the loss function L. Upon completion of the training, for an unknown microscope image lying within a statistical distribution of the training data T, the machine learning model M is able to calculate an output image that corresponds to the target data G, i.e., constitutes a confidence map for an image processing result of the microscope image.

The target data G used in the training is based on image processing results of the image processing algorithm with which a microscope image is to be processed. If there are a plurality of image processing algorithms, the training can take into account contextual information regarding the image processing algorithm that a corresponding part of the training data T and associated target data G relates to.

FIG. 6 shows the application of the machine learning model M based on a raw image or microscope image 30. The latter is input into an image processing algorithm 25 which calculates an image processing result 40, in this example a result image 41. The raw image/microscope image 30 is also input into the machine learning model M, which was trained as described in relation to FIG. 5. The machine learning model M calculates at least one confidence score 50 for the input raw image/microscope image 30, in the illustrated example a confidence map 51.

FIG. 7

Figure 7:
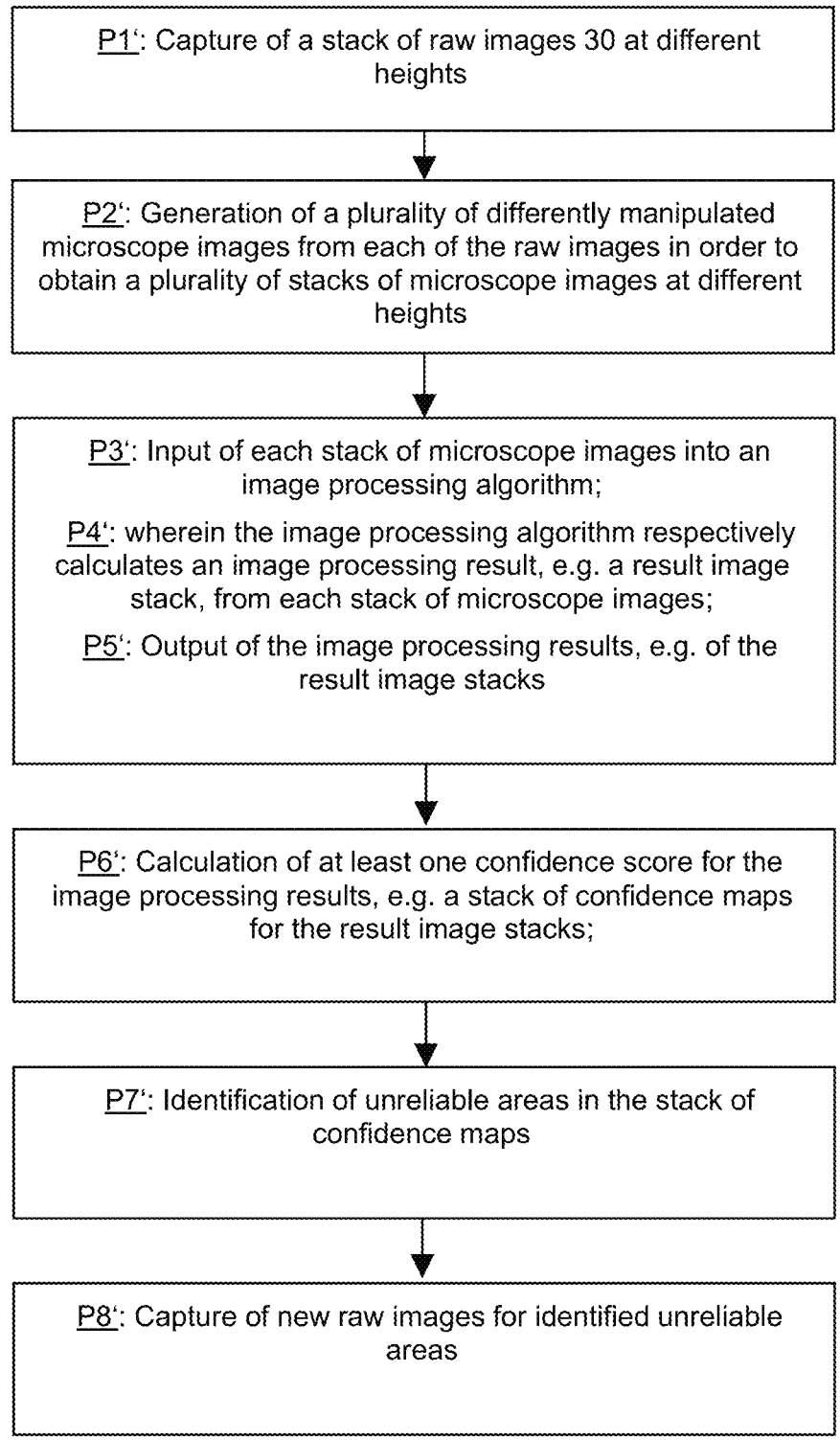
FIG. 7 shows a flowchart of a further example embodiment of a method of the invention.

FIG. 7 illustrates a flowchart of a further example embodiment of a method according to the invention. It differs from the previous examples in particular in that an image stack (z stack) of raw images at different heights is captured, process P1'. In this case, an image processing algorithm is intended to process all images in the image stack, as opposed to merely a single image. This can occur by means of a joint calculation operation in which all images of an image stack are fed together to the image processing algorithm. For example, a 3D model can be calculated.

Similar to previous example embodiments, different microscope images are now generated in process P2' by means of image manipulation, e.g., by adding image noise. Two or more different stacks of microscope images are thereby generated. In one variant, different manipulations are performed on each of the raw images (e.g. different noise is added) so that all microscope images in one stack differ from the microscope images in another stack. In principle, however, different microscope images can also be generated from only one raw image or a part of the raw images. Other raw images, on the other hand, are adopted unaltered as microscope images in the stacks of microscope images, i.e., the different stacks of microscope images can also contain partially identical microscope images.

In process P3', each stack of microscope images is input into the image processing algorithm. In process P4', the latter respectively calculates an image processing result for each stack, e.g., a result image stack or a 3D model, which is output in process P5'.

In process P6', at least one confidence score for the image processing results is calculated. A plurality of confidence scores can form, e.g., a stack of confidence maps, wherein each confidence map is associated with a corresponding result image of the result image stack. If the generated image processing result is a 3D model, a plurality of confidence scores can be analogously determined for different spatial coordinates. The confidence scores are again calculated based on a correspondence between the image processing results.

In process P7', it is determined whether one or more of the confidence scores exceeds a predefined threshold value and thus whether the associated image processing result is considered unreliable. Unreliable areas in, e.g., the stack of confidence maps are identified by this means.

One or more raw images of the areas classified as unreliable can then be re-captured in process P8'.

A sample area requiring additional analysis is thus selected as a function of a robustness of the image processing vis-à-vis slight variations in image information relating to this sample area. The method differs especially in this respect from conventional methods for indicating confidence levels in general and from conventional decision criteria governing whether or not sample areas should undergo additional analysis in particular.

In variations of the described examples, an image capture with a microscope does not occur in process P1 or P1'; instead, one or more existing raw images or microscope images are loaded from a memory. These images originate with a camera, which can be an overview camera or a sample camera of a microscope.

The described example embodiments are purely illustrative and variants of the same are possible within the scope of the attached claims.

LIST OF REFERENCE SIGNS

1 Microscope
2 Stand
3 Objective revolver
4 Microscope objective
5 Sample stage
7 Sample carrier
9 Overview camera
9A Field of view of the overview camera
9B Mirror
10 Microscope camera
15 Illumination device
20 Computing device
25 Image processing algorithm
27 Manipulation program
28 Image noise
30 Raw image
30A-30D Microscope images
22 Sets of microscope images
40, 40A-40B Image processing results
41, 41A-41B Result images
42A-42B Sections of the result images 41A-41B
45 Confidence level calculation program
46 Confidence score machine learning model
50 Confidence score
51 Confidence map
52 Section of the confidence map
53 Image area in which the confidence score exceeds a threshold value
55 Output of the machine learning model M
80 Computer program of the invention
100 Microscopy system of the invention
G Target data
L Loss function
M Machine learning model
Optimization function
P1-P6 Method processes of example embodiments of the invention
P1'-P8' Method processes of example embodiments of the invention
T Training data

What is claimed is:

1. A method for evaluating image processing results, comprising
    receiving, on a computer system including at least one computing device, at least two microscope images that show the same structure;
    the computer system processing each of the microscope images with a same image processing algorithm for calculating respective image processing results, wherein each of the microscope images is processed independently of each other with the same image processing algorithm such that each image processing result is calculated from only a respective one of the microscope images;

the computer system determining at least one confidence score of the image processing results by determining differences between the image processing results calculated by the same image processing algorithm from different microscope images of the same structure.

2. The method according to claim 1,
wherein the microscope images correspond to different captured raw images which show the same structure and differ in random image noise.

3. The method according to claim 1,
wherein at least two of the microscope images are based on the same raw image and differ by a performed image manipulation.

4. The method according to claim 3,
wherein the performed image manipulation comprises one or more of the following operations:
adding image noise;
mirroring or rotating image content;
excising or replacing image content;
condensing or stretching image content;
deforming and subsequently restoring image content;
modifying a brightness, tonal values or a contrast;
blurring or sharpening image content;
an image resolution modification.

5. The method according to claim 1,
wherein the image processing algorithm comprises a trained machine learning model, which respectively calculates an image processing result from each of the microscope images,
wherein each image processing result is a result image and the image processing algorithm for calculating the result images respectively processes the microscope images in at least one of the following ways: by means of a denoising, a deconvolution, a resolution enhancement, an artefact removal, a filling of image regions and holes, a mapping to another microscopy contrast method, a segmentation or an object detection; or
wherein each of the image processing results is a classification result, a geometric variable or a count value of objects found in the microscope image.

6. The method according to claim 1,
wherein the computer system uses a variance or a statistical measure of deviation between the image processing results for determining the differences between the image processing results.

7. The method according to claim 1,
wherein the image processing results are result images, and
wherein the computer system generates a confidence map by respectively determining the confidence score for different image pixels or image areas of the result images.

8. The method according to claim 7,
wherein the computer system uses the confidence map to evaluate whether the image processing algorithm is suitable for the captured structure and whether a retraining of an image processing algorithm formed with a trained machine learning model should occur.

9. The method according to claim 1,
wherein a confidence score machine learning model receives the image processing results as inputs and calculates the at least one confidence score as an output.

10. The method according to claim 1,
wherein the image processing results are result images, and
wherein a number, shape or size of certain objects or structures in the result images is taken into account for determining the differences between the result images.

11. The method according to claim 1,
wherein image areas for which the confidence score exceeds a threshold value
are analyzed by capturing a new image,
are labelled with a warning,
are provided with artificial noise, or
are filled in with image information from at least one of the microscope images.

12. The method according to claim 1,
wherein the computer system determines how at least one image processing parameter of the image processing algorithm is to be modified as a function of the confidence score, and
wherein a new processing of the microscope images or one of the microscope images is carried out by the image processing algorithm with the at least one modified image processing parameter.

13. The method according to claim 1,
wherein the computer system repeats the processing of microscope images in order to calculate image processing results and the determining of at least one confidence score of image processing results for different sets of microscope images,
wherein the computer system uses the sets of microscope images as training data of a machine learning model and the computer system uses the associated confidence scores as target data in a training of the machine learning model so that the machine learning model is trained to calculate a mapping to at least one confidence score from a microscope image.

14. A method for evaluating image processing results,
wherein an image processing algorithm calculates an image processing result for an entered microscope image, and
wherein the computer system inputs the microscope image into a machine learning model which calculates at least one confidence score for the input microscope image, wherein the machine learning model is learned by carrying out the method of claim 13.

15. A computer program stored on a non-transitory computer-readable medium with commands that, when the computer program is executed by a computer system, cause the execution of the method according to claim 1.

16. A microscopy system comprising:
a microscope with a camera for capturing microscope images; and
a computing device, which is configured to calculate an image processing result from a microscope image using a same image processing algorithm and to calculate at least one confidence score for the image processing result;
wherein the computing device is configured to determine the at least one confidence score for an image processing result by:
respectively processing at least two microscope images showing the same structure by means of the image processing algorithm and calculating respective image processing results, wherein each of the microscope images is processed independently of each other with the same image processing algorithm such that each image processing result is calculated from only a respective one of the microscope images,
determining the at least one confidence score by determining differences between the image processing results calculated by the same image processing algorithm from different microscope images of the same structure.

17. The microscopy system according to claim 16, wherein the computing device is further configured to use the at least one confidence score to determine a reliability of the image processing results and/or evaluate a suitability of the image processing algorithm for the captured structure and/or determine whether a re-training of the image processing algorithm should occur.

18. The method according to claim 1, further comprising the computer system using the at least one confidence score in determining a reliability of the image processing results and/or in evaluating a suitability of the image processing algorithm for the captured structure and/or in determining whether a re-training of the image processing algorithm should occur.

19. The microscopy system according to claim 16, wherein the at least one confidence score indicates a reliability of the image processing results.

20. The method according to claim 1, wherein the at least one confidence score indicates a reliability of the image processing results.

* * * * *